July 18, 1950            J. B. LE POOLE            2,515,926
DEVICE FOR EXAMINING CRYSTALLINE STRUCTURE
BY MEANS OF CATHODE-RAYS
Filed Jan. 31, 1947

J. B. LE POOLE
INVENTOR
BY
AGENT

Patented July 18, 1950

2,515,926

UNITED STATES PATENT OFFICE 2,515,926

DEVICE FOR EXAMINING CRYSTALLINE STRUCTURE BY MEANS OF CATHODE RAYS

Jan Bart Le Poole, Eindhoven, Netherlands, assignor to Hartford National Bank and Trust Company, Hartford, Conn., as trustee Application January 31, 1947, Serial No. 725,670
In the Netherlands January 12, 1946

Section 1, Public Law 690, August 8, 1946
Patent expires January 12, 1966

8 Claims. (Cl. 250—49.5)

This invention relates to a device for examining the structure of crystalline substances by means of cathode-rays. Such examination is based on the diffraction of the rays in the lattices of the crystals, owing to which so-called diffraction images may be obtained.

In order that the invention may be more clearly understood and carried into effect, it will now be described in connection with the appended drawing in which.

Figure 1:
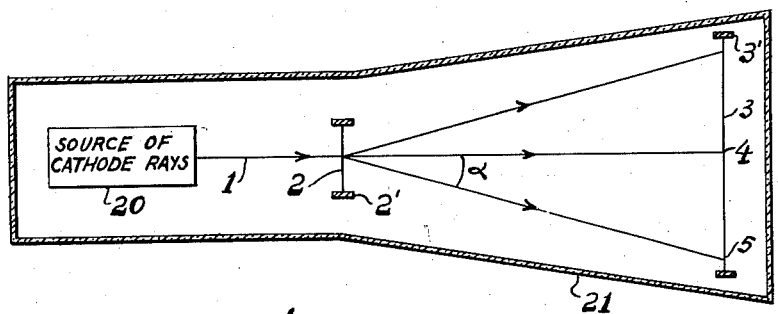
Fig. 1 illustrates an electron diffraction device without an electron beam focussing member.

Fig. 1 of the accompanying drawing shows diagrammatically the manner in which such diffraction images are formed. Reference numeral 1 designates the axis of a narrow beam, parallel or substantially parallel which emanates from a source of cathode rays shown on the left and fall upon a thin plate 2, made from a crystalline substance and held by a suitable support 2'. The plate is so thin that the majority of the rays pass through it in a straight line. A luminous screen 3 is arranged at right angles to the axis 1 and held by a suitable support 3'. The source 10, plate 2, and screen 3 are contained within an enclosure 21. A luminous spot is formed about the intersection 4 of the axis 1 and the screen 3 since the straightly-passing rays impinge in situ upon the screen.

Owing to an interference phenomenon in the crystal lattices, the rays are in part subject to diffraction and hence emerge from the plate 2 at an angle with the axis 1. Fig. 1 shows such a diffracted ray which makes an angle $\alpha$ with the axis 1 and which falls upon the screen 3 at point 5. Diffractions at different angles occur which are characteristic of the structure of crystals. In the case of a multitude of crystals the diffraction of rays equally occurs towards all sides. Thus, there are produced on the screen 3 luminous circles having point 4 as their centre. The rays diffracted at an angle $\alpha$ produce, for example, a circle having a radius equal to the distance between points 4 and 5. These circles together form the diffraction image. From their brilliance and their mutual distances conclusions may be made concerning the nature of the constitutive substance of plate 2. If there are only few crystals, the circles may exhibit uneven brilliances and may even fall apart into a plurality of spots or points located on a circular periphery.

The angle of diffraction is dependent not only upon the structure of the crystal lattices but also on the wavelength of the rays which, in its turn, is determined by the voltage to which the electrons owe their acceleration. The angle $\alpha$ is determined by the equation $$\sin \alpha = \frac{\lambda}{d}$$

in which $\lambda$ represents the wavelength of the rays and $d$ represents a spacing occurring periodically in the crystal (generally referred to as the "width" of the lattice). The wavelength $\lambda$ is calculated with the aid of the formula of the Broglie equation $$\lambda = \frac{12.3}{\sqrt{U}}$$

in which $U$ is the acceleration voltage in voltage and $\lambda$ the wavelength in Ångsström units.

From these formulae it appears that in the case of a variation of the voltage $U$ into $U+\Delta U$, the angle $\alpha$ undergoes a variation $\mp \Delta \lambda$ and, hence, the radius of the luminous circle on the screen also varies. Consequently, if the voltage is not constant, but exhibits a ripple in its characteristic curve, the voltage variations have the effect of widening the luminous circle through point 5. This influence may become so great that the various rings can no longer be differentiated from one another or that their mutual distances can no longer be measured accurately. The same error occurs even if the rays used are not monochromatic.

The object of the invention is to obviate this disadvantage without having recourse to comparatively complicated and costly steps to eliminate the ripple of the voltage or to render the beam of rays purely monochromatic.

According to the invention, the object and the screen have arranged in between them a magnetic lens, the refractive power of which is chosen to be such that a variation thereof due to a variation in wavelength compensates or substantially compensates, within certain limits, the variation in the diameters of the circles of the diffraction image brought about by the same variation.

As a rule, this condition appears to be fulfilled by lenses having a refractive power such that the intersection of the diffracted rays and the screen is reduced thereby to approximately ⅔ of the distance from the axis.

Figure 2:
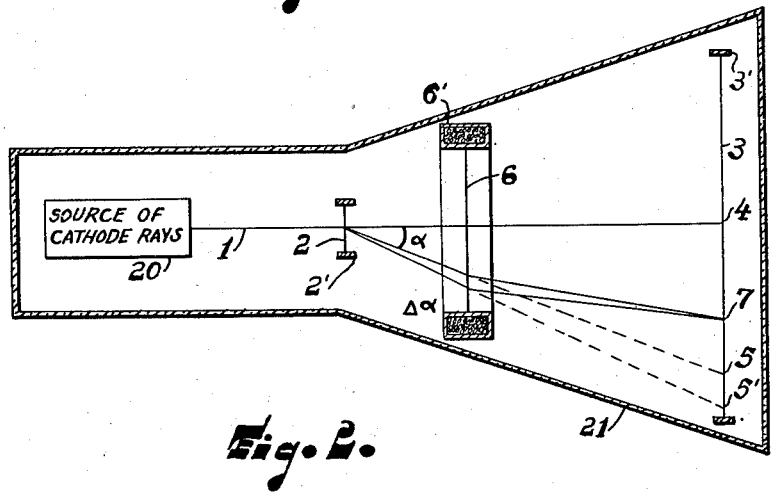
Fig. 2 illustrates an electron diffraction device according to the invention in which an electron beam focussing member is employed.

As shown in Fig. 2 reducing the voltage U to which the electrons impinging on the plate 2 owe their acceleration, by ΔU, the diffraction angle α is enlarged by Δα. As a result of this voltage reduction, the point of impact 5 in the screen 3 is displaced to 5'. Consequently, in the case of a periodical variation in voltage the luminous circles would be widened to form a ring having a width equal to the distance between the points 5 and 5', if no steps were taken to prevent this. However, the object 2 and the screen 3 have arranged in between them a magnetic lens 6', the main plane of which is designated 6. This lens causes the rays diffracted through an angle α to be refracted towards the axis and brings the point of impact on the screen from 5 back to 7.

A property of the magnetic lens 6' is that it causes greater refraction of the cathode-rays, as the velocity of the electrons is smaller. According to the invention, this property is utilized to obviate as far as possible the chromatic deviation of the diffraction images. For this purpose the focal length of the lens 6' is chosen to be such that a ray deviating slightly differently owing to a small variation in voltage passes, nevertheless, through the same point 7 on the screen on account of the variation in the refractive power of the lens brought about by the same voltage variation. Consequently, the luminous circle is not widened to any appreciable extent through the diffraction variations. If the refractive power of the lens is such that the distance between the points 7 and 4 equals ⅔ of the distance between the points 4 and 5, this condition is fulfilled and the same lens causes both point 5 and point 5' to be displaced to point 7.

It is necessary that the strength of the magnetic field should not be altered by the voltage variation since the resulting change of the refractive power of the lens would amplify instead of attenuate the phenomenon to be obviated. It is therefore advantageous to generate the field of the magnetic lens by means of a permanent magnet.

When using a lens for obtaining diffraction images, the most-defined circles (or points) and, consequently, the most favourable results are obtained if the screen is arranged at the area, at which the beams of rays passing through the lens are of smallest section. When using exactly parallel rays, this is the focus of the lens. In a device according to the invention the focal distance of the lens, that is the distance between the main plane 6 and the screen 3, in this case equals ⅔ of the distance between the object 2 and the screen 3.

An important advantage of the device according to the invention is that it permits the electron gun to be supplied by alternating voltage, in which event the current is passed only during part of the effective half-cycle. This may be effected in known manner by connecting a control electrode through a condenser, to a point having an alternating voltage relatively to the cathode. In this case the combination of the control electrode and the cathode operates as a rectifier and passes a current charging the condenser up to a voltage which will always be slightly lower than the maximum value of the alternating voltage. The voltage of the condenser may be controlled by means of resistances connected in parallel and in series with the condenser. Thus, current may be passed, for example, during ⅙ of a cycle and, consequently, during $\frac{1}{12}$ before and during $\frac{1}{12}$ after the maximum. The variation of the voltage during this ⅙ of a cycle is about 16%, which is not too much to be commanded by the lens in the device according to the invention.

Figure 3:
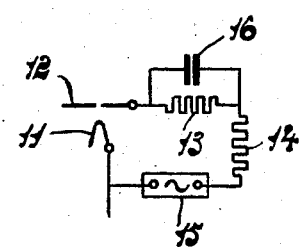
Fig. 3 illustrates a preferred form of energizing circuit for the electron beam source of Fig. 2.

Fig. 3 shows, by way of example, a circuit for rendering effective a definite portion of the voltage wave. Reference numerals 11 and 12 designate the cathode of a thermionic tube and a control electrode respectively. The other electrodes are not shown. The control electrode 12 is connected, through resistances 13 and 14 and a source 15 of alternating voltage, to the cathode 11. A condenser 16 is connected in parallel to the resistance 13. The condenser is charged up to part of the voltage of the source 15, owing to which the control grid 12 is positive with respect to the cathode during part of each cycle of the alternating voltage.

Figure 4:
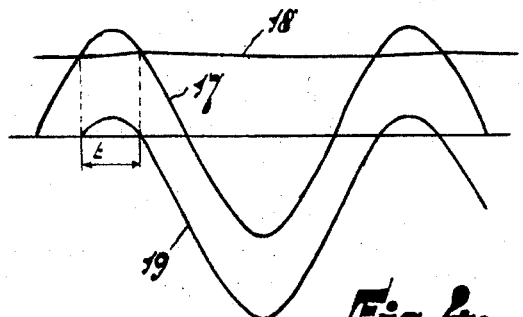
Fig. 4 illustrates diagrammatically the voltage relationships of the applied voltage and the voltage available at the condenser shown in the circuit arrangement of Fig. 3.

Fig. 4 shows, to complete the explanation, a voltage diagram. Curve 17 represents the voltage of source 15. Curve 18 represents the negative value of the voltage of the condenser. The voltage set up at the auxiliary electrode 12 relatively to the cathode 11 is represented by curve 19. This voltage is generally negative, but at the instants at which the voltage 17 attains its maximum positive value, it is positive so that the control electrode will pass current during a short period of time t, within which the voltage does not deviate to an appreciable extent from its maximum value. The variation of the refractive power of the lens 6 prevents the variation of the voltage during the period of time t from affecting the diffraction image produced on the screen 3. It is assumed, of course, that in this case the accelerating voltage of the thermionic tube is in phase with the voltage of the alternating current supply 15.

In the case of objects exhibiting few crystals, in which clear observation of the location of the individual luminous points is desired, the rotation of the image brought about by the magnetic lens and also varying with the velocity of the electrons may be a source of trouble. A means of obviating this disadvantage consists in the use of a double lens having opposite fields, owing to which, as is well-known, the rotation of the image is suppressed.

What I claim is:

1. A cathode ray diffraction device for obtaining diffraction patterns of a crystalline material, comprising a source for an electron beam directed along a given axis, an electron responsive indicating member in spaced relationship with said source and axially aligned therewith for producing a diffraction image thereon, means to support said crystalline material between said source and said indicating member and in the path of said electron beam, and a constant field producing electron beam focussing member interposed between said crystalline material and said indicating member, said beam focussing member having a refractive power such that divergent electrons entering said focussing member from a given point of said crystalline material and at an angle to said beam axis which varies inversely proportional to the velocity of the electrons are converged to points substantially equidistant from the point of intersection of said beam axis and said electron indicating member.

2. A cathode ray diffraction device for obtaining diffraction patterns of a crystalline material, comprising a source for an electron beam directed along a given axis, an electron responsive indicating member in spaced relationship with said source and axially aligned therewith for producing a diffraction image thereon, means to support said crystalline material between said source and said indicating member and in the path of said electron beam, and a constant field producing electron beam focussing member interposed between said crystalline material and said electron indicating member, said beam focussing member having a refractive power such that divergent electrons entering said focussing member from a given point of said crystalline material and at an angle to said beam axis which varies inversely proportional to the velocity of the electrons are converged to points substantially equidistant from the point of intersection of said beam axis and said electron indicating member, said focussing member being positioned to converge electrons on said electron indicating member at points which are approximately 2/3 of the distance from the point of intersection of the axis of the beam and the electron indicating member that the electrons would normally intercept in the absence of the focussing member.

3. A cathode ray diffraction device for obtaining diffraction patterns of a crystalline material, comprising a source for an electron beam directed along a given axis, an electron responsive indicating member in spaced relationship with said source and axially aligned therewith for producing a diffraction image thereon, means to support said crystalline material between said source and said indicating member and in the path of said electron beam, and a constant field producing electron beam focussing member interposed between said crystalline material and said electron indicating member, said beam focussing member having a refractive power such that divergent electrons entering said focussing member from a given point of said crystalline material and at an angle to said beam axis which varies inversely proportional to the velocity of the electrons are converged to points substantially equidistant from the point of intersection of said beam axis and said electron indicating member, said electron indicating member being positioned at the point of minimum cross-section of said electron beam after emerging from said focussing member.

4. A cathode ray diffraction device for obtaining diffraction patterns of a crystalline material, comprising a source for an electron beam directed along a given axis, an electron responsive indicating member in spaced relation with said source and axially aligned therewith for producing a diffraction image thereon, means to support said crystalline material between said source and said indicating member and in the path of said electron beam, and a constant field producing electron beam focussing member interposed between said crystalline material and said indicating member and positioned at a distance equal to 2/3 of the focal length of said focussing member from said indicating member, said beam focussing member having a refractive power such that divergent electrons entering said focussing member from a given point of said crystalline material and at an angle to said beam axis which varies inversely proportional to the velocity of the electrons are converged to points substantially equidistant from the point of intersection of said beam axis and said electron indicating member.

5. A cathode ray diffraction device for obtaining diffraction patterns of a crystalline material, comprising a source for an electron beam along a given axis, an electron responsive indicating member in spaced relationship with said source and axially aligned therewith for producing a diffraction image thereon, means to support said crystalline material between said source and said indicating member and in the path of said electron beam, and a constant field producing electron beam focussing member interposed between said crystalline material and said electron responsive indicating member, said beam focussing member comprising a permanent magnetic system for magnetically focussing the beam of electrons after emerging from the said crystalline material, said beam focussing member having a magnetic refractive power such that divergent electrons entering the field of said permanent magnet system from a given point of said crystalline material and at an angle to said beam axis which varies inversely proportional to the velocity of the electrons are converged to points substantially equidistant from the point of intersection of said beam axis and said electron indicating member.

6. A cathode ray diffraction device for obtaining diffraction patterns of a crystalline material, comprising a source for an electron beam directed along a given axis, an electron responsive indicating member in spaced relationship with said source and axially aligned therewith for producing a diffraction image thereon, means to support said crystalline material between said source and said indicating member and in the path of said electron beam, and a constant field producing electron beam focussing member interposed between said crystalline material and said indicating member, said beam focussing member comprising means to generate opposing magnetic fields to create a double magnetic lens for focussing said electron beam after emerging from said crystalline material, said beam focussing member having a refractive power such that divergent electrons entering said focussing member from a given point of said crystalline material and at an angle to said beam axis which varies inversely proportional to the velocity of the electrons are converged to points substantially equidistant from the point of intersection of said beam axis and said electron indicating member.

7. A cathode ray diffraction device for obtaining diffraction patterns of a crystalline material, comprising a source for an electron beam directed along a given axis, means to modulate said source with an alternating current voltage which energizes said source during the region of maximum voltage in each half-cycle of said alternating current voltage, an electron responsive indicating member in spaced relationship with said source and axially aligned therewith for producing a diffraction image thereon, means to support said crystalline material between said source and said indicating member and in the path of said electron beam, and a constant field producing electron beam focussing member interposed between said crystalline material and said indicating member, said beam focussing member having a refractive power such that divergent electrons entering said focussing member from a given point of said crystalline material and at an angle to said beam axis which varies inversely proportional to the velocity of the electrons are converged to points substantially equidistant from the point of intersection of said beam axis and said electron indicating member.

8. A cathode ray diffraction device for obtaining diffraction patterns of a crystalline material, comprising a source for an electron beam directed along a given axis, said source comprising a first electrode for generating a stream of electrons, and a second auxiliary electrode connected to said first electrode through a capacitor and a source of alternating-current voltage whereby said first electrode is energized during voltage peaks of the alternating-current voltage cycle, an electron responsive indicating member in spaced relationship with said source and axially aligned therewith for producing a diffraction image thereon, means to support said crystalline material between said source and said indicating member and in the path of said electron beam, and a constant field producing electron beam focussing member interposed between said crystalline material and said indicating member, said beam focussing member having a refractive power such that divergent electrons entering said focussing member from a given point of said crystalline material and at an angle to said beam axis which varies inversely proportional to the velocity of the electrons are converged to points substantially equidistant from the point of intersection of said beam axis and said electron indicating member.

JAN BART LE POOLE.

REFERENCES CITED

The following references are of record in the file of this patent:

UNITED STATES PATENTS

| Number | Name | Date |
| --- | --- | --- |
| 2,219,193 | Mynall | Oct. 22, 1940 |
| 2,219,194 | Mynall | Oct. 22, 1940 |
| 2,253,864 | Muller | Aug. 26, 1941 |
| 2,301,987 | Von Borries | Nov. 17, 1942 |
| 2,418,349 | Hillier et al. | Apr. 1, 1947 |
| 2,457,092 | Simard et al. | Dec. 21, 1948 |